United States Patent [19]

Willer et al.

[11] Patent Number: 5,120,827
[45] Date of Patent: Jun. 9, 1992

[54] PROCESS FOR PRODUCING IMPROVED POLY(GLYCIDYL NITRATE)

[75] Inventors: Rodney L. Willer; Robert S. Day, both of Newark, Del.; Alfred G. Stern, Elkton, Md.

[73] Assignee: Thiokol Corporation, Ogden, Utah

[21] Appl. No.: 561,797

[22] Filed: Aug. 2, 1990

[51] Int. Cl.$^5$ .............................................. C08G 65/10
[52] U.S. Cl. .................................. 528/408; 528/403; 528/420; 549/512
[58] Field of Search ....................... 528/403, 408, 420; 549/512

[56] References Cited

U.S. PATENT DOCUMENTS

| | | | |
|---|---|---|---|
| 3,305,565 | 2/1967 | Mueller | 549/516 |
| 3,531,534 | 9/1970 | Adolph | 568/589 |
| 3,557,181 | 1/1971 | Lakritz et al. | 568/589 |
| 4,393,199 | 7/1983 | Manser | 528/408 |
| 4,511,742 | 4/1985 | Yu | 568/621 |

OTHER PUBLICATIONS

S. D. Morse, Polymerization and Modifications of Low Molecular Weight Polyethers, U. of Dayton Research Inst., Report No. UDR-TR-83-116, 40 pp., Oct. 1983.
R. Willer et al., Proceedings of the Jt. Int'l. Symp. on Comp. of Plastics and Other Mat'ls with Expl., Prop., Pyrotech and Processing of Expl. Prop. and Ingredients, 23-25 Oct. 1989, Virginia Beach, Va., pp. 258-269.
E. Colclough et al., Proceedings of the Jt. Int'l. Symp. on Comp. of Plastics and Other Mat'ls with Expl., Prop., Pyrotech and Processsing of Expl., Prop. and Ingredients, 23—25 Oct. 1989, Virginia Beach, Va. pp. 235-240.
D. Debenham, Proceedings of the Jt. Int'l. Symp. on Comp. of Plastics and Other Mat'ls With Expl., Prop., Pyrotech and Processisng of Expl., Prop. and Ingredients, 23-25 Oct. 1989, Virginia Beach, Va. pp. 119-129.
S. Penczek et al., Lecture at IUPAC 6th Int'l. Symp. on Cationic Polymerization & Related Processes, Ghent, Aug. 1983, "Cationic Polymerization and Related Processes", E. J. Goethals Ed., Academic Press, 1984, pp. 139-154.
K. Brzezinska et al., Makromol. Chem., Rapid Commun., 7, pp. 1-4, (1986).
S. Penczek et al., Makromol. Chem., Macromol. Symp., 3, pp. 203-217 (1986).
M. Bednarek et al., Makromol. Chem. Suppl. 15, pp. 49-60 (1989).
C. C. Gonzales et al., Makromol. Chem., 190, pp. 1217-1224 (1989).
Naval Ordnance Laboratory NAVWEPS Report 7409, A Survey of Nitro-Organic Compounds Related to Solid Propellant Systems (U), pp. 34-37, 61-64, 121, 129, 130, 132, 134, 137, 138, 143-146, Jun. 20, 1961.
U.S. Naval Ordnance, NAVORD Report 2028, Polyglycidyl Nitrate, Part 1, Preparation and Characterization of Glycidyl Nitrate, NOTS 685, 13 pages plus abstract, May 6, 1953.
U.S. Naval Ordnance, NAVORD Report 2028, Polyglycidyl Nitrate, Part 2, Preparation and Characterization of Polyglycidyl Nitrate, NOTS 686, 20 pages plus abstract, May 7, 1953.
Jet Propulsion Laboratory, Publication No. 93, High-Performance Polyglycidyl Nitrate-Polyurethane Propellants, 33 pages, Mar. 29, 1957.
Defense Technical Information Center (DTIC), Document Nos. AD 144756 and AD 139462, 1957.
ACS Symp. Series 286, Ring-Opening Polymerization Kinetics, Mechanism and Synthesis, Chapter 25, Cationic Ring-Opening Polymerization of Epichlorohydrin in the Presence of Ethylene Glycol, Y. Ohamoto, pp. 361-372, J. E. McGrath, editor, ACS 1985.
ACS Symp. Series 286, Ring-Opening Polymerization Kinetics, Mechanism and Synthesis, Chapter 20, Homopolymerization of Epoxides in the Presence of Fluorinated Carbon Acids, J. Robins et al, pp. 263-274, J. E. McGrath, editor ACS 1985.
Translation of article by Y. I. Estrin et al, Vysokomol. soyed., A10: No. 11, Kinetics of Polymerization of Epichlorohydrin Glycidyl Nitrate Catalyzed by $BF_3$, pp. 2589-2599, 1968.
Translation of article by A. I. Kuzayev et al, Vysokomol. soyed., A11: No. 5, Polymerization Kinetics of Tetrahydrofuran Caused by $BF_3$.THF in the Presence of Glycidyl Nitrate in 1,2-Dichloroethane, pp. 989-994, 1969.
Translation of article by S. G. Entelis et al, Vysokomol. soyed., A13: No. 6, Regularities of Cationic Polymerization of Cyclic Ethers, pp. 1438-1446, 1971.
G. V. Korovina et al., J. Poly. Science: Part C, No. 16, pp. 3575-3579 (1968).

*Primary Examiner*—John Kight, III
*Assistant Examiner*—Shelley A. Wright
*Attorney, Agent, or Firm*—Cushman, Darby & Cushman

[57] ABSTRACT

An improved process for producing poly(glycidyl nitrate) having a functionality substantially equivalent to the hydroxy functionality of the initiator employed in which a catalyst-initiator complex is reacted with glycidyl nitrate and wherein the ratio of mols catalyst/mols hydroxyls in the initiator is <1:1, the gylcidyl nitrate monomer is added to the catalyst-initiator complex reaction mixture at a rate in which the monomer is used up (reacted) essentially as fast as it is added, and the reaction temperature is maintained at a temperature within the range of from about 10° to 25° C.

27 Claims, No Drawings

PROCESS FOR PRODUCING IMPROVED POLY(GLYCIDYL NITRATE)

FIELD OF THE INVENTION

This invention relates to an improved method for the production of poly(glycidyl nitrate), an energetic prepolymer readily and easily curable to an elastomer to provide an improved binder for solid high-energy compositions.

BACKGROUND OF THE INVENTION

Solid high-energy compositions, such as propellants, explosives, gasifiers, or the like, comprise solid particulates, such as fuel particulates and/or oxidizer particulates, dispersed and immobilized throughout a binder matrix comprising an elastomeric polymer.

Binders previously used in composite solid propellant formulations have generally been non-energetic polymers such as polycaprolactones, polyethyleneglycols or polybutadienes. Since about 1950 there has been a considerable need to develop energetic binders with satisfactory mechanical properties in order to provide safer binders at higher energy levels and to increase the energy level or specific impulse in a propellant formulation. For the most part only nitrocellulose has found usefulness as an energetic polymer binder. However, nitrocellulose suffers from undesirable mechanical properties. Alternatively, it has been proposed to employ conventional non-energetic polymer binders in combination with energetic plasticizers such as for example, nitroglycerine, butanetriol trinitrate, and trimethylolethane trinitrate. It has also been suggested that the energetic polymer nitrocellulose be employed with either non-energetic or energetic plasticizers in an attempt to improve mechanical properties. However, none of these proposals has led to fully acceptable energetic binder formulations. Furthermore, there are many occasions when the use of plasticizers is undesirable or its use is not possible, such as when "clean" space motor/gas generator propellants or "clean" large launch vehicle propellants are required.

Thus, there has been a continuing need for energetic polymers to be available for use in formulating solid high-energy compositions, such as propellants, explosives, gasifiers and the like. In this regard much recent work has centered on attempts to produce acceptable energetic polymers of glycidyl azide polymer and poly(oxytanes). A problem with elastomeric binders formed from poly(oxytanes) is their tendency to have mechanical characteristics less than that which would be desirable for a high-energy composition, particularly for a rocket motor propellant. It is especially difficult to provide poly(oxytane) binders having adequate stress capabilities. On the other hand glycidyl azide polymer is synthesized by first polymerizing epichlorohydrin to poly(epichlorohydrin) which is then converted to glycidyl azide polymer by reaction with sodium azide in dimethylsulfoxide. Beside the lack of a simple synthesis process, the production of glycidyl azide polymer requires relatively expensive reagents.

Since the early 1950's poly(glycidyl nitrate), hereinafter referred to as PGN, has been known and recognized as an energetic prepolymer. The initial work on PGN was done by Thelan et al. at the Naval Ordnance Test Station (NOTS, now Naval Weapons Center, NWC). They studied the polymerization of glycidyl nitrate by a variety of Lewis Acid catalysts with most of the work centering on the use of stannic chloride as a catalyst. No propellants were prepared by the NOTS workers and they noted that one drawback to their synthesis was the laborious purification procedure.

PGN AND PGN propellants were next examined at the Jet Propulsion Laboratory (JPL) by Ingnam and Nichols and at Aerojet General Corporation by Shookhoff and Klotz. The JPL workers found that PGN made using boron trifluoride etherate was low in both functionality (i.e. <2) and molecular weight (MW=1500) and therefore polyurethane propellants made from this PGN had poor mechanical properties. Similar observations were made by the Aerojet workers. In summary, it has long been recognized that PGN would be an excellent energetic polymer but until now a method of synthesis could not be found that would produce nearly difunctional material with acceptable hydroxyl equivalent weights.

It is therefore desirable and an object of this invention that a process for the production of PGN be provided that would produce nearly difunctional material with acceptable hydroxyl equivalent weights. A further object of this invention is to provide a process for the production of PGN that produces "propellant quality" PGN. A still further object of this invention is to provide a process to produce PGN having a functionality of nearly 2.0 and a hydroxyl equivalent weight of about 1000-1700 or more, preferably about 1200 to 1600. It is yet another object of this invention to provide a process for producing PGN that has present greatly reduced amounts of cylic oligomer, that is about 2-5% by weight or less.

SUMMARY OF THE INVENTION

An improved process for the production of PGN, in which cylic oligomer formation is suppressed and PGN having a functionality substantially equal to the functionality of the polyol initiator and an acceptable hydroxyl equivalent weight is obtained, is provided by a process wherein a catalyst-initiator complex is formed and reacted with glycidyl nitrate (GN) and wherein the ratio of mols catalyst/mol hydroxyls in the initiator is <1:1, the glycidyl nitrate is added to the catalyst-initiator complex reaction mixture at a rate substantially equivalent to the rate at which it reacts with the complex such that no effective net amount of glycidyl nitrate monomer is built up, i.e. monomer is used up essentially as fast as it is added to the reaction mixture, and the reaction temperature is maintained within the range of from about 10°-25° C. Additionally, the process provides for the removal of any potential alkoxide groups, such as ethoxide groups, from the catalyst-initiator complex mixture when the catalyst employed in the process leads to the formation of such groups.

DETAILED DESCRIPTION OF THE INVENTION

According to the process of this invention glycidyl nitrate,

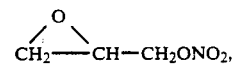

is polymerized to PGN,

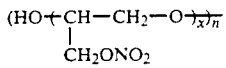

initiator, wherein n is an integer essentially equivalent to the hydroxy functionality of the initiator and x is an integer representing the repeating units, by forming a catalyst-initiator complex and reacting the complex with glycidyl nitrate and wherein the ratio of mols catalysts/mols hydroxyls in the initiator is <1:1, the glycidyl nitrate monomer is added to the catalyst-initiator complex reaction mixture at a rate in which the monomer is used up (reacted) essentially as fast as it is added, and the reaction temperature is maintained at a temperature within the range of from about 10° to 25° C.

The polymerization reaction is a cationic polymerization process conducted using a polyol initiator and an acid catalyst. The acid catalyst may be chosen from among those known in the art, including $BF_3$, $HBF_4$ and triethyloxonium hexafluorophosphate (TEOP). The Lewis acid catalyst forms a preinitiator complex with the polyol, for example, butanediol is known to form a complex with boron trifluoride ($BF_3$).

The polyol initiator employed generally has the hydroxyl groups of the polyol unhindered. The polyol is preferably a diol. As examples of suitable diols there may be mentioned ethylene glycol, propylene glycol, 1,3-propanediol and 1,4-butanediol. Suitable triols include, but are not limited to glycerol, trimethylolpropane and 1,2,4-butanetriol. A suitable tetrol is, but is not limited to 2,2'-dihydroxymethyl-1,3-propanediol. The molecular weight of the polyol is relatively low, preferably less than 500, more preferably below 300 and most preferably below about 150.

In accordance with the invention, the acid catalyst is used at a much lower level relative to hydroxyl groups of the polyol than is taught in the prior art. It was discovered that a much more controlled reaction occurs if the catalyst, such as a Lewis Acid, is used at a molar ratio relative to hydroxyl groups of the polyol of less than 1:1, preferably from about 0.4:1 to about 0.8:1. If a proton acid is used as the catalyst, the ratio of hydrogen ions released by the acid catalyst to the hydroxyl groups of the alcohol is also less than 1:1, preferably 0.4:1 to about 0.8:1. By using a substantially lower level of acid catalyst, incorporation of a greater percentage of the polyol molecules internally within polymer molecules is achieved, cylic oligomer formation is suppressed to a level of about 2 to 5% or less, and lower polydispersity is achieved.

The cationic polymerization reaction may be carried out in a suitable organic solvent conducive to the cationic polymerization. If a solvent is employed, such suitable solvent is a non-protic, non-ether, inert solvent. Such solvents include, but are not limited to methylene chloride, chloroform, and 1,2-dichloroethane.

The polymerization reaction is conducted in a manner whereby the glycidyl nitrate monomer is added to the reaction mixture at a rate essentially equivalent to its rate of reaction, so that no effective net concentration of monomer is built up in the reaction mixture and the reaction temperature is maintained at a temperature within the range of from about 10° to 25° C., preferably from about 11° to 17° and most preferably about 13° to 15° C. It Will be appreciated that the faster heat is taken away from the reactive mixture the faster glycidyl nitrate monomer can be added to the reaction mixture.

It has also been discovered that when the reaction of catalyst and initiator results in the formation of alkoxide groups in the catalyst-initiator complex, such as for example, the presence of alkoxide group compounds in the reaction mixture formed by the reaction of boron trifluoride etherate and 1,4-butanediol, the resulting PGN products are low in functionality. It was additionally discovered that pre-reacting the polyol 1,4-butanediol and boron trifluoride etherate and then removing diethylether under vacuum produces a PGN product essentially free of alkoxide groups. If, however, the catalyst and initiator would not form products containing such alkoxide groups, such as when boron trifluoride gas is employed instead of boron trifluoride etherate, then prereaction of the catalyst and initiator and removal of potential alkoxide compounds is not necessary.

The hydroxyl equivalent weight of the PGN polymer produced according to this invention will generally be from about 1000 to 1700 or more, preferably from about 1200 to about 1600.

The invention is now illustrated in greater detail by way of the following illustrative examples.

EXAMPLE 1

The following is a typical example of a method for the production of poly(glycidyl nitrate) according to this invention. A clean, dry, three neck r.b. flask is equipped with a vacuum adapter, rubber septum, magnetic stirring bar and a thermometer. The flask is charged with 29.7 g (0.33 mole) of dry 1,4-butanediol, cooled to 20° C. and 46.8 g (0.33 mole) of $BF_3$ etherate is slowly added via a syringe while maintaining the temperature below 25° C. This mixture is stirred for 1 hr. at 25° C. then the ether is removed by pulling a partial vacuum for 1 hr. and a full vacuum for 16 hrs. Dry methylene chloride (175 ml) is added to the flask and the contents are transferred using a cannula to a clean dry 5 liter jacketed resin flask previously filled with 400 ml dry methylene chloride and cooled to 10° C. equipped with a mechanical stirrer, thermometer, $N_2$ purge, and a peristaltic addition pump. An additional 25 ml of dry methylene chloride is used to insure quantitative transfer of the catalyst initiator complex. The temperature in the reactor is adjusted to 13±2° C. and a solution of 1190 g (10 moles) of monomer grade glycidyl nitrate in 800 ml of dry methylene chloride is added at such a rate as to maintain a temperature of 13±2° C. This typically takes 4.5 hours. The reaction is stirred for 0.5 hr. then quenched by the addition of 400 ml of a saturated sodium chloride solution. The brine solution is separated and the methylene chloride solution of PGN is washed three times with 500 ml of saturated sodium bicarbonate solution. The methylene chloride solution is dried over magnesium sulfate and the methylene chloride removed on a rotoevaporator at a pressure of <1 mm and a temperature of 40° C. (1 hr.) and 55° C. (2 hrs.) to give essentially a quantitative yield of poly(glycidyl nitrate) as a viscous light yellow liquid.

EXAMPLES 2-28

The following Table summarizes the results of the foregoing Example 1 and thirty-two other typical preparations. The polyol initiator employed in all examples was 1,4-butanediol except for Example 18 where the polyol employed was glycerol.

TABLE

| Example No. | Moles GN | Moles Initiator | mL CH$_2$Cl$_2$ | Catalyst | Moles Catalyst | Reaction Temp. °C. | Addit. Time (hr.) | Reaction Time (hr.) | Yield % | MW Theory | Mn GPC | MW GPC | Hydroxyl Equiv. Weight |
|---|---|---|---|---|---|---|---|---|---|---|---|---|---|
| 1 | 10.0 | 0.33 | 1460 | BF$_3$ | 0.33 | 12–14 | 4.0 | 0.3 | 97 | 3696 | 2188 | 4369 | 1484 |
| 2 | 1.0 | 0.05 | 400 | BF$_3$ | 0.05 | 25 | 1.3 | 1.5 | 95 | 2470 | 900 | 1490 | 1201 |
| 3 | 1.0 | 0.033 | 400 | BF$_3$ | 0.05 | 25 | 1.2 | 2.5 | 95 | 3660 | 890 | 1600 | — |
| 4 | 1.0 | 0.05 | 400 | BF$_3$ | 0.05 | 20 | 1.2 | 0.5 | 96 | 2470 | 950 | 1520 | 1493 |
| 5 | 1.0 | 0.05 | 200 | BF$_3$ | 0.05 | 20 | 1.0 | 0.6 | 95 | 2470 | 1180 | 1740 | 1453 |
| 6 | 1.0 | 0.05 | 100 | BF$_3$ | 0.05 | 20 | 1.5 | 0.3 | 95 | 2470 | 1040 | 1730 | 1100 |
| 7 | 0.25 | 0.01 | 100 | TEOP | 0.01 | 30 | 0.6 | 1.0 | 95 | 2470 | 780 | 1320 | — |
| 8 | 1.0 | 0.04 | 200 | BF$_3$ | 0.04 | 15 | 2.3 | 0.25 | 95 | 3065 | 1700 | 3410 | 1760 |
| 9 | 1.0 | 0.033 | 200 | BF$_3$ | 0.033 | 15 | 2.3 | 0.3 | 95 | 3696 | 1780 | 3620 | 1274 |
| 10 | 2.0 | 0.10 | 400 | BF$_3$ | 0.10 | 15 | 4.6 | 0.25 | 95 | 2470 | 1750 | 3140 | 991 |
| 11 | 5.0 | 0.165 | 910 | BF$_3$ | 0.165 | 11–13 | 3.5 | 1.0 | 99 | 3696 | 2022 | 3896 | 1281 |
| 12 | 0.50 | 0.017 | 100 | BF$_3$ | 0.008 | 22–30 | 2.9 | 0.25 | 108 | 3624 | 1701 | 3263 | 1250 |
| 13 | 1 | 0.032 | 150 | BF$_3$ | 0.024 | 9–17 | 3.0 | 0.25 | 95 | 3808 | 4474 | 5288 | 1193 |
| 14 | 10 | 0.33 | 1425 | BF$_3$ | 0.33 | 11–15 | 4.4 | 0.33 | 98 | 3696 | 825 | 4450 | 1212 |
| 15 | 10 | 0.33 | 1425 | BF$_3$ | 0.33 | 11–15 | 4.4 | 0.36 | 99 | 3696 | 795 | 4726 | 1201 |
| 16 | 10 | 0.33 | 1425 | BF$_3$ | 0.33 | 12–14 | 4.5 | 0.33 | 94 | 3697 | 968 | 4500 | 1191 |
| 17 | 2 | 0.10 | 285 | BF$_3$ | 0.10 | 11–15 | 2.6 | 0.5 | 95 | 2470 | 646 | 1200 | 1129 |
| 18 | 1 | 0.033 | 145 | BF$_3$ | 0.05 | 11–20 | 1.9 | 1.6 | 95 | 3698 | 960 | 1020 | 1751 |
| 19 | 10 | 0.33 | 1425 | BF$_3$ | 0.33 | 11–14 | 4.8 | 1.0 | 99 | 3696 | 960 | 1961 | 1608 |
| 20 | 10 | 0.33 | 1425 | BF$_3$ | 0.33 | 11–14 | 4.8 | 1.0 | 99 | 3696 | 907 | 1728 | 1618 |
| 21 | 10 | 0.33 | 1425 | BF$_3$ | 0.33 | 11–14 | 4.9 | 1.0 | 99 | 3696 | 917 | 1736 | 1642 |
| 22 | 10 | 0.33 | 1425 | BF$_3$ | 0.33 | 11–14 | 5.1 | 0.9 | 98 | 3696 | 884 | 1685 | 1607 |
| 23 | 10 | 0.33 | 1425 | BF$_3$ | 0.33 | 11–14 | 5.1 | 1.0 | 98 | 3696 | 897 | 1723 | 1633 |
| 24 | 1.1 | 0.037 | 258 | BF$_3$ | 0.037 | 10–16 | 2.6 | 0.3 | 98 | 3696 | 2142 | 2922 | 1296 |
| 25 | 1.1 | 0.037 | 288 | BF$_3$ | 0.074 | 11–15 | 1.1 | 0.3 | 98 | 3696 | 1884 | 3406 | 1373 |
| 26 | 1.1 | 0.037 | 288 | BF$_3$ | 0.030 | 11–22 | 2.0 | 0.3 | 98 | 3696 | 2221 | 3048 | 1387 |
| 27 | 1.0 | 0.05 | 150 | HBF$_4$.OEt$_2$ | 0.05 | 11–17 | 1.5 | 0.3 | 88 | 2472 | 1300 | 1745 | 863 |
| 28 | 1.0 | 0.05 | 150 | (VAC) HBF$_4$.OEt$_2$ | 0.05 | 11–18 | 1.7 | 1.2 | 84 | 2472 | 1697 | 3729 | 999 |
| 29 | 1.0 | 0.05 | 150 | HBF$_4$ (aq,vac) | 0.05 | 11–17 | 1.1 | 0.3 | 103 | 2472 | 1696 | 3457 | 981 |
| 30 | 101.6 | 3.35 | 14631 | BF$_3$ | 3.30 | 11–14 | 8.6 | 1.0 | 101 | 3698 | 1078 | 1661 | 1515 |
| 31 | 100.0 | 3.30 | 14503 | BF$_3$ | 3.30 | 11–14 | 4.9 | 1.0 | 101 | 3698 | — | — | 1663 |
| 32 | 10.0 | 0.33 | 1450 | BF$_3$(g) | 0.33 | 11–16 | 3.0 | 0.75 | 99 | 3698 | — | — | 1609 |

The theoretical molecular weight (MW) was determined by adding the MW of the initiator to the product obtained by dividing the grams of monomer by moles of initiator. MW and Mn are the weight average and number average molecular weights, respectively, and were determined by GPC using polystyrene as the calibration standard with a series of four columns from 100 to 100,000 angstroms employed for separation. The hydroxy equivalent weight was determined using an anhydride titration method and NMR endgroup analysis.

The improved PGN produced according to the process of this invention finds use as a binder in high-energy compositions, such as propellants, explosives, gasifiers or the like. Particular uses for the improved PGN of this invention in high-energy compositions are disclosed in concurrently filed application Ser. Nos. 07/561,800; 07/561,951; 07/561,973; and 07/561,774. The PGN is admixed with other components of a high-energy formulation, such as a propellant formulation. It is desirable that the PGN be chain extended with polyfunctional isocyanates.

Although not necessary, but if desired, in addition to the PGN the binder system may optionally contain a plasticizer. The plasticizer may be present in an amount up to a plasticizer to PGN ratio of about 2.5:1. The plasticizer, if present, is preferably a high-energy plasticizer such as nitroglycerine, butanetriol trinitrate, and trimethylolethane trinitrate.

The solids content of the high-energy composition will generally range from about 40 wt. percent to about 85 wt. percent, higher solids loading generally being preferred so long as this is consistent with structural integrity. The solids include fuel material particulates, such as particulate aluminum, beryllium or, beryllium hydride or oxidizer particulates, such as ammonium nitrate, ammonium perchlorate, cyclotetramethylene tetranitramine (HMX) and cyclotrimethylene trinitramine (RDX). In addition, the high-energy composition may include minor amounts of additional components known in the art, such as bonding agents, burn rate modifiers, etc.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. A process for the production of poly(glycidyl nitrate) by cationic polymerization employing a polyol initiator and an acid catalyst in which cylic oligomer formation is suppressed and poly(glycidyl nitrate) having a functionality substantially equal to the functionality of the polyol initiator is obtained, said process comprising forming a catalyst-initiator complex and reacting said complex and glycidyl nitrate to produce poly(glycidyl nitrate) and wherein the ratio of mols catalyst /mol hydroxyls in the initiator is <1:1, the glycidyl nitrate is added to the catalyst-initiator complex at a rate substantially equivalent to the rate at which the glycidyl nitrate reacts with the complex such that no effective net amount of glycidyl nitrate monomer is built up, and the reaction temperature is maintained within the range of from about 10°–25° C.

2. A process according to claim 1 wherein the polyol initiator is a diol or triol.

3. A process according to claim 2 wherein the catalyst is selected from the group consisting of BF$_3$, HBF$_4$ and triethyloxonium hexafluorophosphate.

4. A process according to claim 1 wherein the ratio of mols catalyst/mols hydroxyl groups of the initiator is from about 0.4:1 to about 0.8:1.

5. A process according to claim 3 wherein the ratio of mols catalyst/mols hydroxyl groups of the initiator is from about 0.4:1 to about 0.8:1.

6. A process according to claim 1 wherein the initiator is butanediol and the catalyst is $BF_3$ etherate.

7. A process according to claim 5 wherein the initiator is butanediol and the catalyst is $BF_3$ etherate.

8. A process according to claim 1 wherein the initiator is butanediol and the catalyst is $BF_3$ gas.

9. A process according to claim 5 wherein the initiator is butanediol and the catalyst is $BF_3$ gas.

10. A process according to claim 1 wherein the initiator is butanediol and the catalyst is $HBF_4$ etherate.

11. A process according to claim 5 wherein the initiator is butanediol and the catalyst is $HBF_4$ etherate.

12. A process according to claim 1 wherein the initiator is butanediol and the catalyst is fluoboric acid.

13. A process according to claim 5 wherein the initiator is butanediol and the catalyst is fluoboric acid.

14. A process according to claim 1 wherein the reaction temperature is maintained at a temperature within the range of from about 11° to about 17° C.

15. A process according to claim 5 wherein the reaction temperature is maintained at a temperature within the range of from about 11° to about 17° C.

16. A process according to claim 9 wherein the reaction temperature is maintained at a temperature within the range of from about 11° to about 17° C.

17. A process according to claim 1 wherein the reaction temperature is maintained at a temperature within the range of from about 13° to about 15° C.

18. A process according to claim 5 wherein the reaction temperature is maintained at a temperature within the range of from about 13° to about 15° C.

19. A process according to claim 9 wherein the reaction temperature is maintained at a temperature within the range of from about 13° to about 15° C.

20. A process according to claim 1 wherein the poly(glycidyl nitrate) has a hydroxyl equivalent weight of from about 120 to about 1600.

21. A process according to claim 5 wherein the poly(glycidyl nitrate) has a hydroxyl equivalent weight of from about 1200 to about 1600.

22. A process according to claim 9 wherein the poly(glycidyl nitrate) has a hydroxyl equivalent weight of from about 1200 to about 1600.

23. A process according to claim 1 wherein about 2 to 5% by weight or less cylic oligomer is produced.

24. A process according to claim 1 wherein the catalyst and initiator are prereacted to form a catalyst-initiator complex and any potential alkoxide group containing products are removed from the catalyst-initiator complex reaction mixture before reaction with glycidyl nitrate.

25. A process according to claim 9 wherein the catalyst and initiator are prereacted to form a catalyst-initiator complex and any potential alkoxide group containing products are removed from the catalyst-initiator complex reaction mixture before reaction with glycidyl nitrate.

26. Poly(glycidyl nitrate) produced according to the process of claim 1.

27. Poly(glycidyl nitrate) produced according to the process of claim 9.

* * * * *